(12) United States Patent
Kajitani et al.

(10) Patent No.: US 10,195,896 B2
(45) Date of Patent: Feb. 5, 2019

(54) METHOD OF MANUFACTURING DECORATIVE MOLDING

(71) Applicant: TOYODA GOSEI CO., LTD., Kiyosu-shi, Aichi-ken (JP)

(72) Inventors: Takushi Kajitani, Kiyosu (JP); Kimihiro Iimura, Kiyosu (JP); Shojiro Miyamoto, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 481 days.

(21) Appl. No.: 14/961,972

(22) Filed: Dec. 8, 2015

(65) Prior Publication Data
US 2016/0229223 A1    Aug. 11, 2016

(30) Foreign Application Priority Data
Feb. 6, 2015   (JP) .................................. 2015-022375

(51) Int. Cl.
*B44C 1/17* (2006.01)
*B29C 65/00* (2006.01)

(52) U.S. Cl.
CPC ...... *B44C 1/1712* (2013.01); *B29C 66/81264* (2013.01); *B29C 66/81423* (2013.01)

(58) Field of Classification Search
None
See application file for complete search history.

(56) References Cited

U.S. PATENT DOCUMENTS

| 9,427,910 B2 | 8/2016 | Ando et al. |
| 2014/0130976 A1 | 5/2014 | Ando et al. |

FOREIGN PATENT DOCUMENTS

| JP | 07-232499 A | 9/1995 |
| JP | 2002-166700 A | 6/2002 |
| JP | 2013-518003 A | 5/2013 |
| JP | 2014-094502 A | 5/2014 |
| WO | 2011/093958 A1 | 8/2011 |

OTHER PUBLICATIONS

Standard JSA-JIS K 6253-1. standards.globalspec.com (Year: 2018).*
Office Action dated Jan. 30, 2018 issued in corresponding JP patent application No. 2015-022375 (and English machine translation thereof).

* cited by examiner

Primary Examiner — Barbara J Musser
(74) Attorney, Agent, or Firm — Posz Law Group, PLC

(57) ABSTRACT

The present invention provides a method of manufacturing a decorative molding with a capability to decorate a large component to be decorated. The method includes pressing a heated pressing member against an area to be decorated having a plurality of spaced-apart surface sections to be decorated, with a transfer sheet interposed between the pressing member and the area to be decorated, to transfer decorative layers to the surface section to be decorated. The area to be decorated has a maximum width of not less than 400 mm. The pressing member has a pressing surface configured to come in contact with the transfer sheet and constituted by a rubber piece shaped into a flat plate. The rubber piece has a hardness of not more than 80 degrees and a thickness of not less than 3 mm, and is curved to fit a general surface shape of the area to be decorated.

2 Claims, 9 Drawing Sheets

METHOD OF MANUFACTURING DECORATIVE MOLDING

BACKGROUND

1. Technical Field

The present invention relates to a method of manufacturing a decorative molding, more particularly, to a method of manufacturing a large decorative molding having a plurality of spaced-apart surface sections to be decorated.

2. Related Art

Vehicles include a radiator grille, which is placed at the vehicle's front end and functions as an air inlet to supply air to the radiator behind the grille while traveling. To perform this function, radiator grilles are formed to have a louver or a mesh that has gaps serving as the air inlets. Additionally, radiator grilles, which are placed on the front surfaces (the outer periphery surfaces) of vehicles, are required to offer high designabilities. To meet such requirements, decorations are added to the front end (the tip) of a louver or a mesh.

One way to decorate a radiator grille (a resin molding) is to form a decorative layer, by hot stamping, on a surface section to be decorated at the front end of the grille. In hot stamping, a heated pressing member is pressed against a transfer sheet placed on a surface section to be decorated (and thereby applies heat and pressure thereto) to transfer the foil in the transfer sheet to the surface section, thereby forming a decorative layer.

More specifically, hot stamping is a process to press a heated stamping plate (a pressing member) against a component to be decorated having a surface section to be decorated (a grille having no decorative layer) with a transfer sheet interposed therebetween to thermal transfer the foil in the transfer sheet to the surface section to be decorated.

In conventional hot stamping, a pressing section included in a stamping plate (a pressing member) for pressing a surface section to be decorated is made of rubber (an elastic body), which is elastically deformable. As illustrated in FIG. 11, a rubber piece 24 forming the pressing section is recessed in a surface (a pressing surface) 23a of a stamping plate (a pressing member) 23 and is shaped to match the shape of the perimeter of a surface section to be decorated 5a.

With such conventional hot stamping, forming a decorative layer in a large grille having a size exceeding 400 mm has been difficult.

More specifically, the end of a louver or a mesh in a vehicle grille presents multiple surface sections to be decorated wish intervals (gaps) therebetween. Vehicle grilles having such shapes tend to suffer significant variability in shrinkage depending on conditions, such as dwell pressure and temperature during molding, thereby lowering dimensional accuracy. This leads to a problem that the positions of surface sections to be decorated 5a and 5b are deviated, as illustrated in FIG. 12. In the illustrated case, the position of the surface section to be decorated 5a relative to that of the surface section to be decorated 5b is deviated. This results in misalignment of the surface section to be decorated 5b and a rubber piece 24b when they are brought into contact with each other with the surface section to be decorated 5a and a rubber piece 24a being aligned. Since the rubber piece 24b is shaped to fit the surface section to be decorated 5b, such a misalignment causes difficulty in uniform contact (uniform pressing). Such nonuniform pressure on the surface section to be decorated 5b results in a transfer defect.

The problem of deviated positions for decoration due to the low dimensional accuracy arises particularly in large components to be decorated with an area to be decorated having a size exceeding 400 mm. Vehicle grilles in particular are large components and are susceptible to low dimensional accuracy.

To solve such a problem, a hot stamping process may be performed more than once using a segmented stamping plate while pressing positions are shifted plural times. This approach, however, is problematic in that the increased number of operation processes results in increased manufacturing costs.

As a solution to this, methods have been studied to use just one process to complete hot stamping on a large component to be decorated (molding). For example, one such method is described in JP 2002-166700A.

JP 2002-166700A describes a method in which a thermal transfer foil (a transfer sheet) is put over a large plastic molding (a component to be decorated) and they are brought into contact with each other by removing air by vacuum with their perimeters clamped together. A stamping plate is then moved up and down (and pressed against the molding) add decorations thereto.

The hot stamping method described in JP 2002-166700A, which is directed to a plastic molding like an air conditioner grille, poses difficulty in application to a component, like a vehicle grille, having spaced-apart sections to be decorated (surface sections to be decorated) with gaps therebetween.

More specifically, the existence of multiple and spaced-apart surface sections to be decorated with gaps therebetween presents a problem as described above that the positions of the surface sections to be decorated relative to each other are deviated. No solution is described for such problems in JP 2002-166700A, posing difficulty in the application of the technique described therein.

Moreover, the method described in JP 2002-166700A uses a molded rubber piece shaped to fit the surface section to be decorated 5a and the surface 23a of the stamping plate 23. This rubber piece 24, which is a molding and tends to harden (to have a high hardness) to maintain the molded shape, is less prone to deform while conforming to the surface section to be decorated 5a where the rubber piece 24 and the surface section 5a are misaligned with each other and pressed together.

SUMMARY

An object of the present invention, which has been achieved in view of the above, is to provide a method of manufacturing a decorative molding with the capability to decorate a large component to be decorated.

The invention provides a method of manufacturing a decorative molding, the method including pressing a heated pressing member against an area to be decorated having a plurality of spaced-apart surface sections to be decorated, with a transfer sheet interposed between the pressing member and the area to be decorated, to transfer decorative layers to the surface sections to be decorated, the area to be decorated having a maximum width of not less than 400 mm, wherein the pressing member has a pressing surface configured to come in contact with the transfer sheet and constituted by a rubber piece shaped into a flat plate, and the rubber piece has a hardness of not more than 80 degrees and a thickness of not less than 3 mm, and is curved to fit a general surface shape of the area to be decorated.

In the manufacturing method according to the invention, the pressing surface of the pressing member is constituted by the rubber piece shaped into a flat plate. The flat plate-like rubber piece has no projections or depressions on the pressing surface (no projections or depressions to define the contact positions with the surface sections to be decorated). This enables the transfer sheet to be transferred to the surface sections to be decorated (to form the decorative layers) regardless of the positions of the surface sections to be decorated on the pressing surface when the pressing surface is pressed against the surface sections to be decorated. This indicates the capability to form the decorative layers without a transfer defect even when the positions of the surface sections to be decorated are deviated.

By pressing the pressing surface (the rubber piece) of the pressing member against the area to be decorated, the decorative layers can be formed on the multiple surface sections to be decorated in one process.

Additionally, the above described features of the flat plate-like rubber piece, namely the hardness of not more than 80 degrees and the thickness of not less than 3 mm, allow the rubber piece to accommodate positional deviations in the area to be decorated, leading to reliable transfer. The hardness of a rubber piece may be measured by using a procedure described in Japan Industrial Standard JIS K 6253.

In the method of manufacturing a decorative molding according to the invention, the rubber piece preferably has a thermal conductivity of not less than 0.4 W/mK at room temperature. With the rubber piece having a thermal conductivity in this range, the component to be decorated (on the surface sections to be decorated) achieves temperatures that allow the transfer sheet to be thermal transferred, i.e., temperatures that can form the decorative layers.

In the method of manufacturing a decorative molding according to the invention, the pressing member is preferably pressed while the pressure is controlled. By pressing the pressing member while the pressure is controlled, the transfer sheet can be transferred reliably to such a large area to be decorated as having a size exceeding 400 mm on a decorative molding. Additionally, the rubber piece will deteriorate and shrink (be fatigued) due to the reiteration of pressing. In a conventional process where the pressing amount (a stroke) is controlled, the surface sections to be decorated cannot be pressed sufficiently with a fatigued and shrunk rubber piece. By controlling the pressure, instead of the pressing amount, during the pressing, the surface sections to be decorated can be pressed reliably with a predetermined pressure in a repeated manner without causing a transfer defect.

With the configuration described above, the manufacturing method according to the invention is capable of forming the decorative layers on a large component to be decorated.

DETAILED DESCRIPTION

Some embodiments of the invention wall now be described in detail.

In one embodiment of a manufacturing method according to the invention, a vehicle radiator grille 1 is described as a large molding to be decorated. In this embodiment, the manufacturing method according to the invention is applied to the grille 1, although moldings to be decorated are not limited to the grille 1.

[Embodiment]

(Radiator Grille 1)

Figure 1:
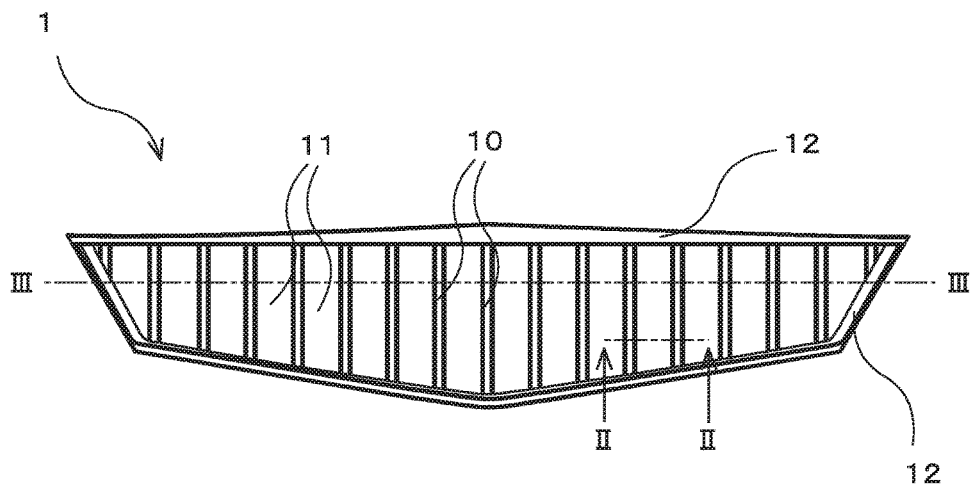
FIG. 1 is a front view of a radiator grille according to an embodiment.

As illustrated in the front view in FIG. 1, the radiator grille 1 spreads in a vehicle width direction (in the lateral direction in FIG. 1) in shape. The grille 1 includes ridges 10 extending in a direction perpendicular to the vehicle width direction (in the vertical direction in FIG. 1) and arranged side by side in the vehicle width direction with gaps 11 therebetween. The grille 1 includes a perimeter portion 12 on the perimeter of the area in which the ridges 10 and the gaps 11 are placed. Each ridge 10 has ends in its extending direction, which are integrated with the perimeter portion 12.

Figure 2:
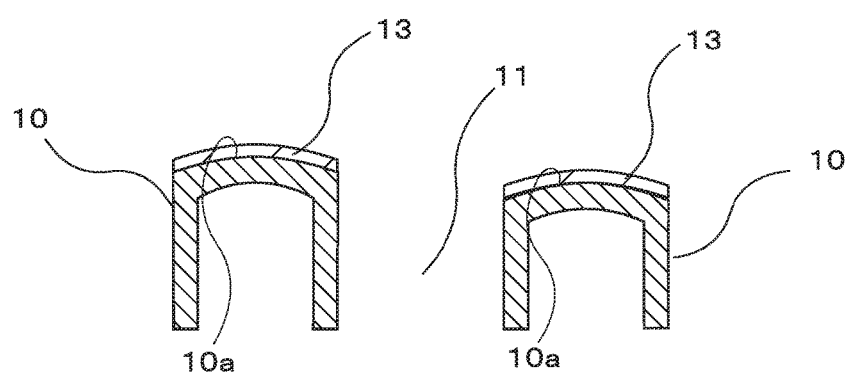
FIG. 2 is a partial sectional view of the radiator grille according to the embodiment.

As illustrated in the sectional view in FIG. 2, each ridge 10 has a tapered and substantially inverted-U-shaped section having a projecting curved end surface 10a. FIG. 2 is a section along the line II-II in FIG. 1. In the embodiment, hot stamping is employed to thermal transfer a transfer sheet to the end surface 10a of each ridge 10 in the grille 1 to form a decorative layer 13 as illustrated in FIG. 2. The end surface 10a corresponds to a surface section to be decorated.

In the embodiment, the ridges 10 extend in the direction perpendicular to the vehicle width direction. The adjacent ridges 10 have the gap 11 between them. In other words, a plurality of spaced-apart surface sections to be decorated are present. The width of the gap 11 (the distance from a ridge 10 to another ridge 10) is not limited and can be sized to satisfy a desired design. In the embodiment, the widths of the gaps 11 (distances between adjacent ridges 10) are identical.

The ridges 10 in the embodiment each have the substantially inverted-U shape including a projecting curved surface that is the end surface 10a as illustrated in the sectional view in FIG. 2, although the shape of each ridge 10 is not limited thereto. The end surface may be planar.

Figure 3:
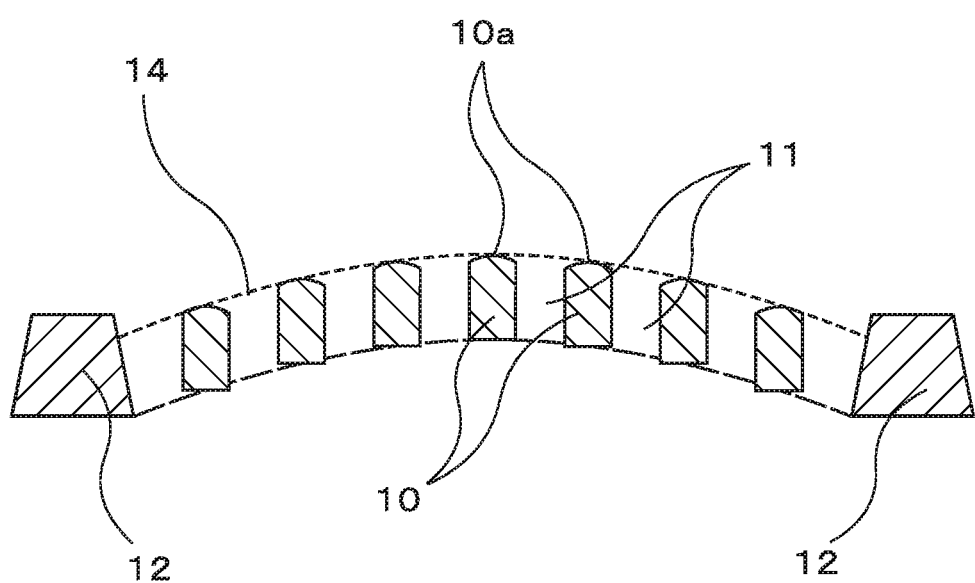
FIG. 3 is a schematic sectional view of the radiator grille according to the embodiment.
Figure 4:
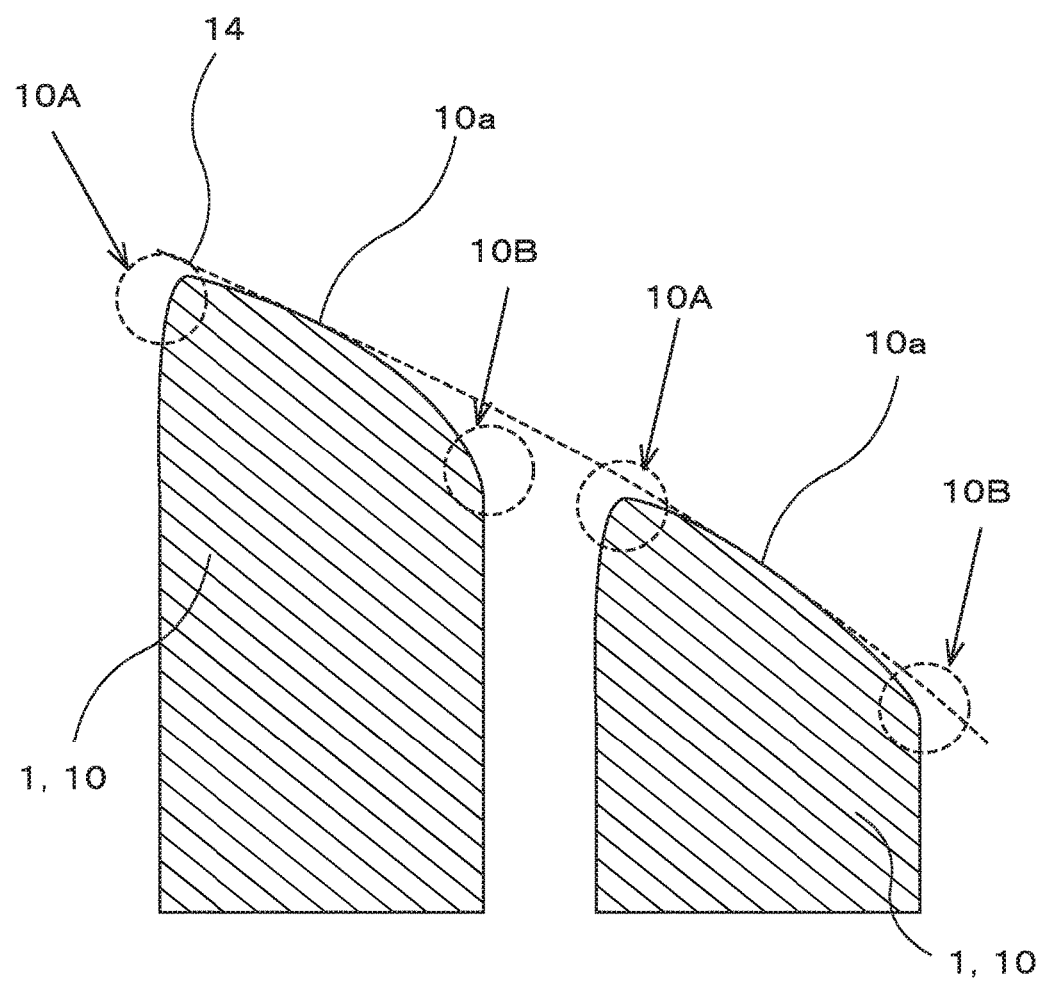
FIG. 4 is a partial enlarged sectional view illustrating an end surface of the radiator grille according to the embodiment.

As illustrated in the schematic sectional view in FIG. 3, the grille 1 includes the ridges 10 in such a manner that the end surfaces 10a are positioned on a projecting curved surface 14 (an imaginary surface of the grille 1 indicated with a broken line in FIG. 3). The curved surface 14 projects the most in its middle in the vehicle width direction. The end surfaces 10a form slopes from the middle toward the ends in the vehicle width direction with the end surfaces 10a toward the ends placed toward the rear of the vehicle. The imaginary surface 14 of the grille 1 also forms slopes from the middle toward the ends in the vehicle width direction. In the embodiment, the individual end surfaces 10a are also formed to be substantially in line with the imaginary surface 14. More specifically, as illustrated in the enlarged view in FIG. 4, the end surface 10a has two ends in the width direction, with one end 10A (located toward the middle in the vehicle width direction) projecting farther than the other end 10B (located outward in the vehicle width direction); in other words, the one end 10A is located above the other end 10B. The end surface 10a, which is curved, is apt to substantially conform to the imaginary surface 14 even when the position of the ridge 10 (and thus the end surface 10a) is deviated. FIG. 3 is a schematic diagram illustrating a section along the line III-III in FIG. 1. In FIG. 3, the contours of the ridges 10 are illustrated, with the decorative layers 13 omitted. FIG. 4, which is a diagram illustrating the relationship between the imaginary surface 14 and some of the end surfaces 10a, is an enlarged view of the section along the line II-II in FIG. 1, like FIG. 2.

In the grille 1 of the embodiment, the area surrounded by the perimeter portion 12 (the area in which the ridges 10 are arranged) corresponds to an area to be decorated. In the grille 1 of the embodiment, the area to be decorated has a length of not less than 400 mm in the vehicle width direction; i.e., its maximum width is not less than 400 mm. The area to be decorated preferably has a long width, and more preferably, has a width of not less than 500 mm. The availability of a larger area to be decorated offers opportunities for diverse designs. In particular, a large area to be decorated can be used to provide a large and long design surface imparting a sense of unity to the design, providing opportunities to emphasize a grille as an icon of a vehicle.

The grille 1 in the embodiment, the material of which is not limited, may be a resin molding formed with resin. The resin used to form the grille 1 includes ABS, AES, PC, copolymerized PC, PMMA, PP, ABS/PC, and other resins (copolymers).

(Hot Stamping Apparatus 2)

Figure 5:
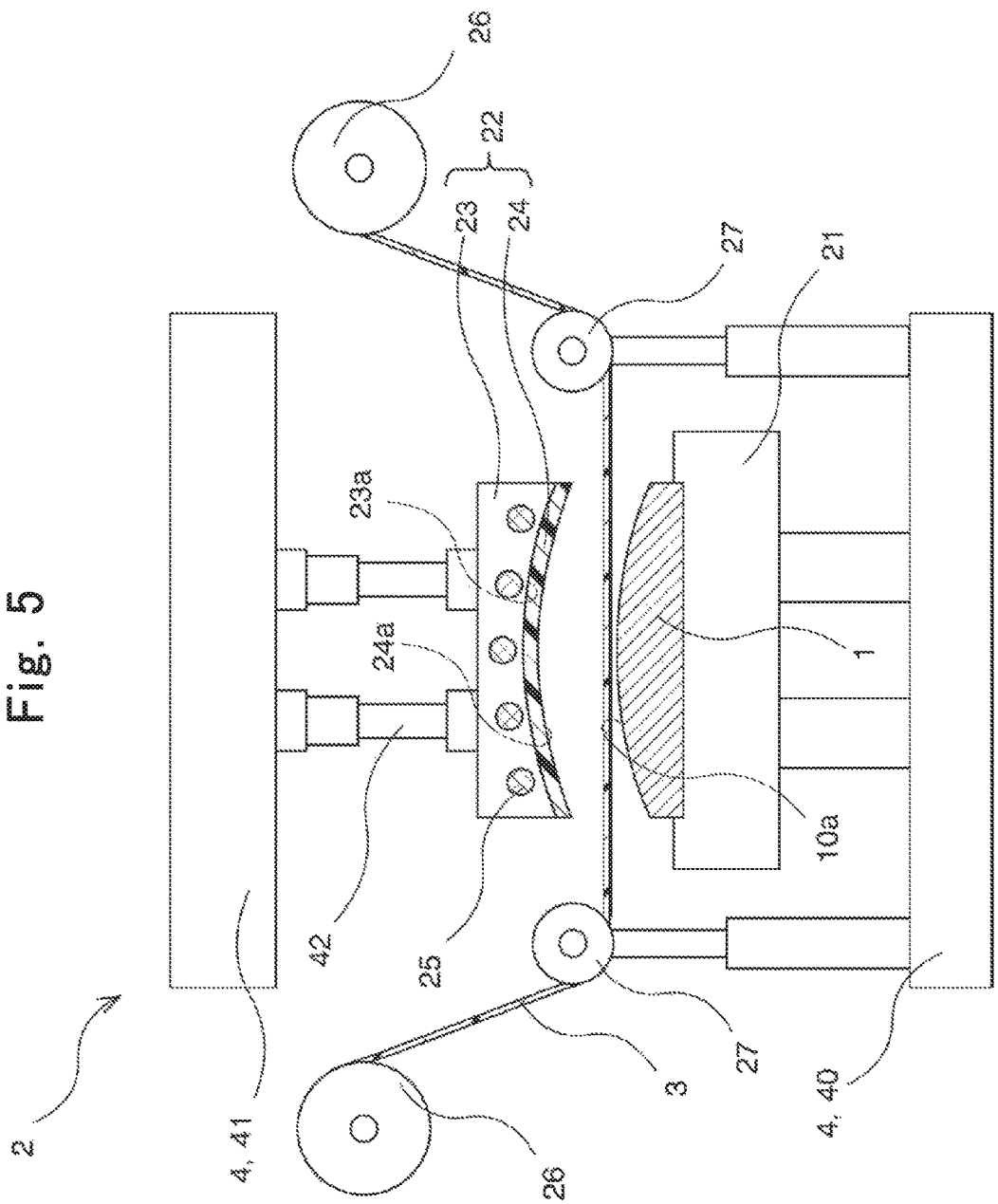
FIG. 5 is a schematic diagram illustrating the configuration of a hot stamping apparatus according to the embodiment.

To manufacture the grille 1 in the embodiment, a hot stamping apparatus 2 is used to form the decorative layers 13. The hot stamping apparatus 2 is schematically illustrated in FIG. 5.

The hot stamping apparatus 2 heats and presses a transfer sheet 3 including a foil 32 against the end surfaces 10a (the surface sections to be decorated) of the ridges 10 in the grille 1 (a component to be decorated) to thermal transfer the foil 32 on the end surfaces 10a, thereby forming the decorative layers 13 on the end surfaces 10a.

The hot stamping apparatus 2 includes a stamping block 22 and a fixture 21. The hot stamping apparatus 2 includes a pressing device 4 configured to retain the fixture 21 and move and press the stamping block 22.

The fixture 21 fixes on its top the grille 1 with the surface sections to be decorated facing upward. The top surface of the fixture 21 is shaped to fit the curved shape of the grille 1 to be fixed. The top surface of the fixture 21 having such a shape allows the fixture 21 to support the ridges 10 on their backs and thereby inhibits deformation in the ridges 10 due to stress applied to the ridges 10 by the stamping block 22 during pressing. The inhibition of deformation in the ridges 10 ensures the application of stress and heat to the surface sections to be decorated.

The fixture 21 includes a fixing unit (not shown) to fix the grille 1. Examples of the fixing unit include a unit to press the grille 1 against the fixture 21, like a clamp, and a unit to suction the grille 1 to fixture 21 under a reduced pressure.

The stamping block 22 corresponds to a pressing member. The stamping block 22 is shaped to press the area to be decorated of the grille 1 (the area in which the ridges 10 and the gaps 11 are arranged); in other words, the stamping block 22 has a perimeter that is shaped to match the perimeter of the area to be decorated or is larger than the perimeter of the area to be decorated, so as to cover the area to be decorated. The stamping block 22 includes a support 23 and a rubber piece 24 disposed on a surface of the support 23. The stamping block 22 presses a surface 24a of the rubber piece 24 against the transfer sheet 3 and the grille 1. The surface 24a of the rubber piece 24 presses the transfer sheet 3 against the end surfaces 10a of the ridges 10 in the grille 1 to transfer (thermal transfer) the transfer sheet 3 thereto. Thus, the rubber piece 24 should have a perimeter shaped to match the perimeter of the area to be decorated.

The support 23 has a curved bottom surface 23a shaped to fit the general shape of the surface sections to be decorated of the grille 1. The support 23 (and the rubber 24) have perimeters shaped to substantially match the perimeter of The area to be decorated of the grille 1, i.e., the support 23 and the rubber 24 are slightly larger than the area to be decorated.

The support 23 is made with a material (for example, metal) having such rigidity (pressure resistance) that the rubber piece 24 deforms elastically when the stamping block 22 is pressed against the grille 1. The support 23 includes a heating unit 25 (a heater).

The heating unit 25 is preferably placed near an edge of the support 23. Placing the heating unit 25 near an edge of the support 23 allows the stamping block 22 to be heated to a transfer temperature for hot stamping without unevenness in temperature.

More specifically, the support 23 is heated by the heating unit 25 to perform the hot stamping. The support 23 is made with metal, which is a material having the rigidity. Since metal has a good thermal conductivity, the support 23 made with metal tends to dissipate heat at portions of the support 23 away from the heating unit 25. The support 23 tends to dissipate heat near its edges (including its side faces). This makes it hard to heat the edges of the support 23 to a temperature that allows hot stamping. Heating the center of the support 23 alone would result in lower temperatures at the edges of the support 23 because of the heat dissipation, leading to a temperature differential (temperature gradient) between the center and an edge. This problem particularly arises in components having a large area to be decorated, like the grille 1. Adding heating units 25 at (or near) edges allows for high temperatures at the edges.

Heating the heating units at or near the edges to temperatures higher than that of the heating unit at the center allows for uniform temperature from the center to the edges. This enables reliable transfer regardless of the location in the area to be decorated. To achieve similar effects, a plurality of heating units may be placed at an edge (in a concentrated manner) and heated to high temperatures. Heating the heating units to high temperatures at an edge is preferable because a total number of heating units can be reduced.

Figure 6:
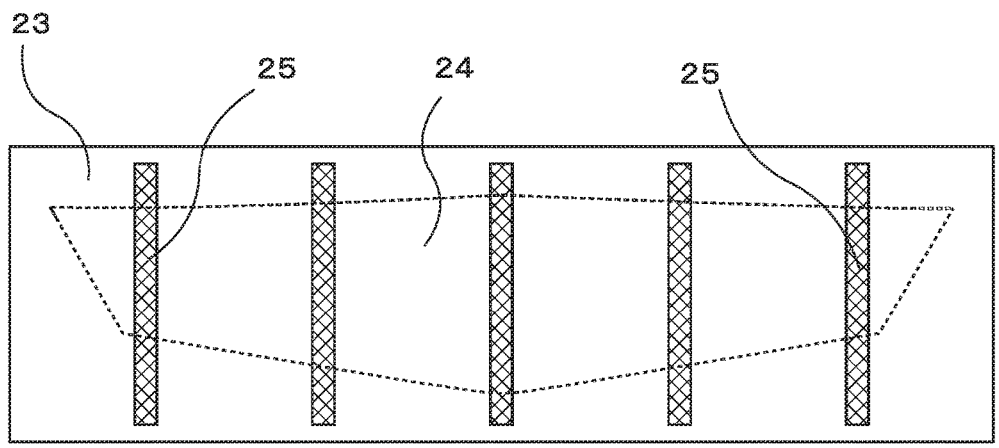
FIG. 6 is a schematic diagram illustrating an arrangement of heating units in a stamping block according to the embodiment.
Figure 7:
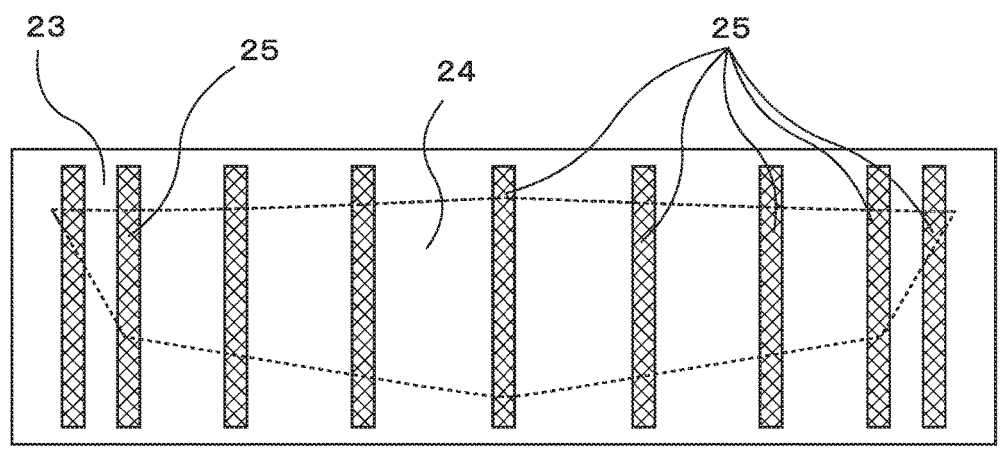
FIG. 7 is a schematic diagram illustrating another arrangement of the heating units in the stamping block according to the embodiment.

The heating units 25 may be disposed near an edge of the support 23 in any arrangement. For example, the heating units 25 may be arranged at two edges in a width direction of the support 23, or in other words arranged uniformly across the entire area in the width direction including the edges, as schematically illustrated in FIG. 6. The heating units 25 may be arranged along the perimeter of the support 23 as schematically illustrated in FIG. 7.

In the stamping block 22, two different points (for example, the center and an edge) on the surface 24*a* of the rubber piece 24 preferably have a temperature differential of not more than 4° C. A temperature difference of not more than 4° C. on the rubber piece 24 inhibits nonuniform transfer in hot stamping and thereby prevents reduction in designability of the decorative layers 13.

The rubber piece 24 is fixed to the bottom surface 23*a* of the support 23 In an integrated manner. The rubber piece 24 is shaped into a flat plate and has a hardness of not more than 80 degrees and a thickness of not less than 3 mm. Here, the flat plate has a constant thickness. The flat plate-like rubber piece 24 has a flat surface with no projections or depressions in the surface. The rubber piece 24 in the embodiment is attached to the bottom surface 23*a* of the support 23 to assume a curved shape like the bottom surface 23*a*; i.e., the rubber piece. 24 is in a flat plate shape before the attachment and in a curved shape after the attachment. The bottom surface 24*a* of the rubber piece 24 located on the side opposite from the support 23 has a shape in agreement with the curved shape of the rubber piece 24. The bottom surface 24*a* serves as a pressing surface.

The rubber piece 24 having a hardness of not more than 80 degrees is capable of deforming elastically while conforming to the surfaces of the ridges 10 when the stamping block 22 is pressed against the grille 1. In other words, the rubber piece 24 deforms elastically while conforming to the surfaces of the ridges 10, to enable the foil 32 in the transfer sheet 3 to be transferred to the end surfaces 10*a* of the ridges 10 by hot stamping.

The rubber piece 24 may have any lower limit for its hardness, although the lower limit is preferably not less than 40 degrees. An excessively low hardness of the rubber piece 24 results in reduction in thermal conductivity of the rubber piece 24, hindering the transfer sheet 3 from achieving a sufficiently high temperature. This leads to transfer irregularity. An excessively low hardness also results in reduction in elasticity of the rubber piece 24, leading to failure in application of pressure sufficient for the transfer. Hence, the hardness of the rubber piece 24 is preferably 40 to 80 degrees, and more preferably 45 to 70 degrees.

The rubber piece 24 has a thickness of not less than 3 mm. A thickness of not less than 3 mm provides conformability due to elastic deformation. A larger thickness of the rubber piece 24 is more preferable, and a thickness of not less than 10 mm is more preferable. An excessively large thickness of the rubber piece 24, however, leads to reduction in thermal conductivity.

The rubber piece 24 preferably has a thermal conductivity of not less than 0.4 W/mK at room temperature. A thermal conductivity of the rubber piece 24 in this range achieves temperatures that allow thermal transfer during hot stamping.

The rubber piece 24 may be made with any material that has the properties described above. Examples of the material of the rubber piece 24 include conventionally known elastic materials, such as silicone rubber.

The pressing device 4 includes a fixture retainer 40 to retain the fixture 21 in a fixed state and a mover 41 to move the stamping block 22.

The fixture retainer 40 supports the fixture 21 in such a manner that the fixture can fix the grille 1 with the surface sections to be decorated facing upward.

The mover 41, which is placed above the fixture 21 held by the fixture retainer 40, moves the stamping block 22 in a vertical direction (in a direction in which the stamping block 22 moves toward or away from the fixture 21).

The mover 41 in the embodiment includes a hydraulic unit 42 to move the stamping block 22 in the vertical direction. The hydraulic unit 42 of the mover 41 is capable of controlling its pressure. More specifically, the hydraulic unit 42 detects a reaction force from the grille 1 when pressing the stamping block 22 and controls its pressure in response to the detected reaction force. Here, excessive pressure application can be prevented by setting a displacement threshold.

(Transfer Sheet 3)

Figure 8:
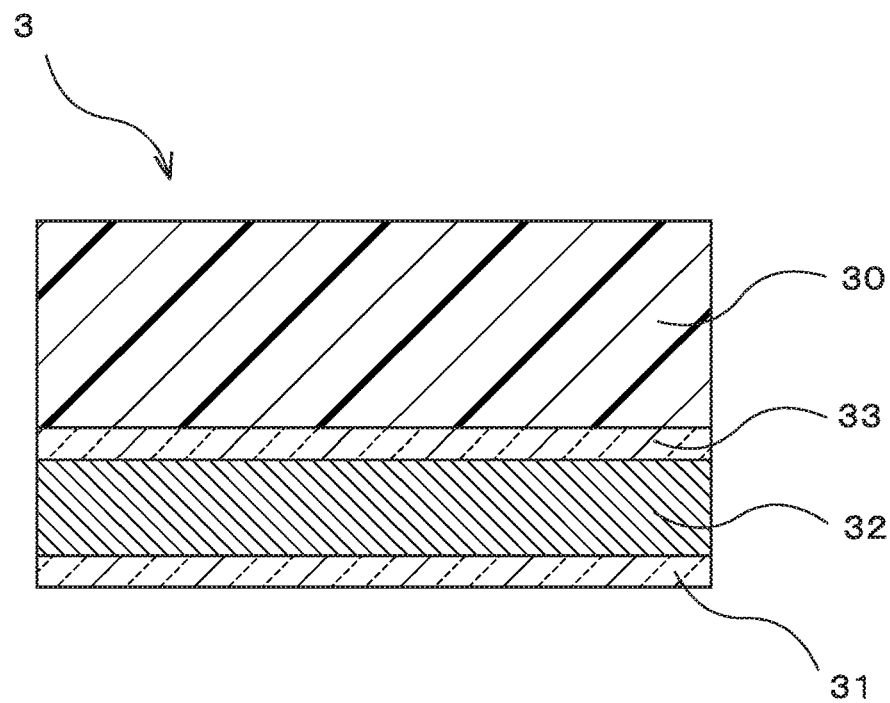
FIG. 8 is a sectional view illustrating the configuration of a transfer sheet.

As illustrated in FIG. 8, the transfer sheet 3 includes a support film 30, a release layer 33 on the support film 30, the foil 32 on the release layer 33, and an adhesive layer 31 on the foil 32.

The support film 30 is made with PET (polyethylene terephthalate) and has a thickness of 25 μm. The release layer 33 is formed with a release agent. To be more specific, the release agent is made of acrylic resin. The foil 32 includes a metallized film and acrylic resin. The bonding layer 31 is made with a thermoplastic adhesive. The adhesive layer 31, the foil 32, and the release layer 33 each have a thickness of 1 □m. This allows the surface sections to be decorated of the grille 1 to have a designed metallic luster. The acrylic resin included in the foil 32 serves as a protective layer for the metallized film to prevent a flaw in the decorative layers 13.

The transfer sheet 3 is placed at a predetermined position on a top surface of the grille 1. Any configuration may be used to place the transfer sheet 3. As illustrated in FIG. 5, a feeder 26 and a tensioner 21 are used in the embodiment. The feeder 26 supplies the transfer sheet 3 to the predetermined position. The tensioner 27 retains the transfer sheet 3 fed by the feeder 26 in such a manner that the transfer sheet 3 has no crease. The tensioner 27 also serves as a contact unit to bring the transfer sheet 3 into closely contact with the grille 1. The tensioner 27 moves in the vertical direction in FIG. 5 to serve as the contact unit.

(Hot Stamping)

The vehicle grille 1 is manufactured (the decorative layers 13 are formed) as described below in the embodiment.

As illustrated in FIG. 5, the grille 1 as formed by injection molding (the component to be decorated) is placed and fixed by the fixture 21. Here, the grille 1 (the component to be decorated) is placed with the surface sections to be decorated facing upward and is fixed by the undepicted fixing unit.

Then, the transfer sheet 3 is place on the top surface of the grille 1 with the adhesive layer 31 facing the grille 1 and the support film 30 facing the stamping block 22. The transfer sheet 3 is stretched and brought into contact with the top surface of the grille 1 (the end surfaces 10*a* of the ridges 10) by the tensioner 27 (the contact unit).

Figure 9:
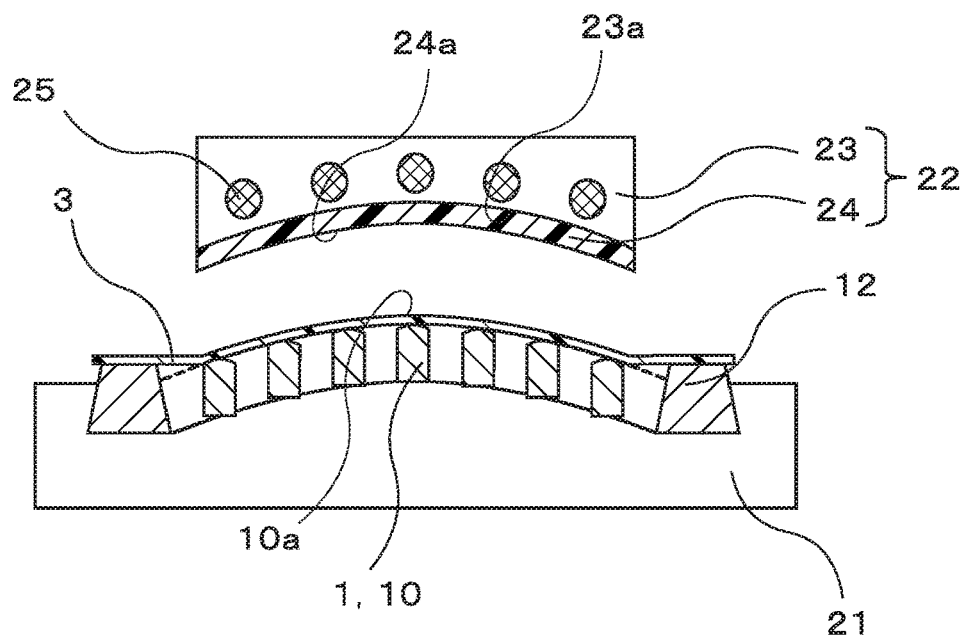
FIG. 9 is a schematic diagram illustrating a hot stamping process with the hot stamping apparatus according to the embodiment.

Then, as illustrated in FIG. 9, the stamping block 22, which is located over the grille 1 (on a line extending in the reciprocating direction of the stamping block 22), is moved downward by the pressing device 4, so that transfer sheet 3 is pressed down against the end surfaces 10*a* of the ridges 10 in the grille 1. At this point in time, the support 23 included in the stamping block 22 is heated by the heating units 25 in such a manner that the pressing surface 24*a* of the rubber piece 24 is heated to a preset temperature that allows the end surfaces 10*a* of the grille 1 to be heated, when pressed, to a predetermined temperature in the range from 130 to 180° C. (135° C. in the embodiment).

To transfer the foil 32 reliably, the adhesive layer 31 included in the transfer sheet 3 should be softened or melted during the pressing. Additionally, an adhesive resulting from the softening or melting of the adhesive layer 31 is applied to the end surfaces 10*a* (the surface sections to be decorated) sufficiently by slightly softening or melting the end surfaces 10*a*, in order that the transfer sheet 3 is bonded to the end surfaces 10*a* firmly. Thus, the end surfaces 10*a* (the surface sections to be decorated) are preferably heated to a temperature not less than the glass transition point (or the melting point). Note that complete softening of the end surfaces 10*a* (the surface sections to be decorated) may result in deformation of the decorations on the design surface, leading to reduction in designability.

Since the end surfaces 10*a* (the surface sections to be decorated) are heated through the rubber piece 24 and the transfer sheet 3, the rubber piece 24 is exposed to the highest temperatures. To prevent melting and damage of the rubber piece 24, the rubber piece 24 is preferably heated to a temperature not more than its heatproof temperature. For example, the rubber piece 24 is preferably heated to a temperature in the range from 130 to 230° C. so that the end surfaces 10*a* are heated to a temperature in the range from 130 to 180° C. The rubber piece 24 is more preferably heated to a temperature in the range from 190 to 230° C. It is desirable to heat the end surfaces 10*a* through the rubber piece 24 in a short period of time to prevent deformation in the end surfaces 10*a* (the ridges 10). The temperature range from 190 to 230° C. allows the end surfaces 10*a* to be heated in a short period.

As illustrated in FIG. 9, the bottom surface 24*a* (the pressing surface) of the rubber piece 24 is curved to fit the general surface shape of the area to be decorated of the grille 1, so that the rubber piece 24 comes in contact with all the end surfaces 10*a* of the ridges 10 in the grille 1 at the same time. This prevents the pressure applied by the stamping block 22 from concentrating on some of the ridges 10.

The grille 1 includes the multiple and spaced-apart surface sections to be decorated (the end surfaces 10*a*) with gaps therebetween, with the end surfaces 10*a* being located on the projecting curved imaginary surface.

The rubber piece 24 has the bottom surface 24*a* (the pressing surface), which is curved to fit the imaginary surface of the area to be decorated in the grille 1; thus, positional deviations of some of the ridges 10 (and thus their end surfaces 10*a*) can be tolerated.

Figure 10:
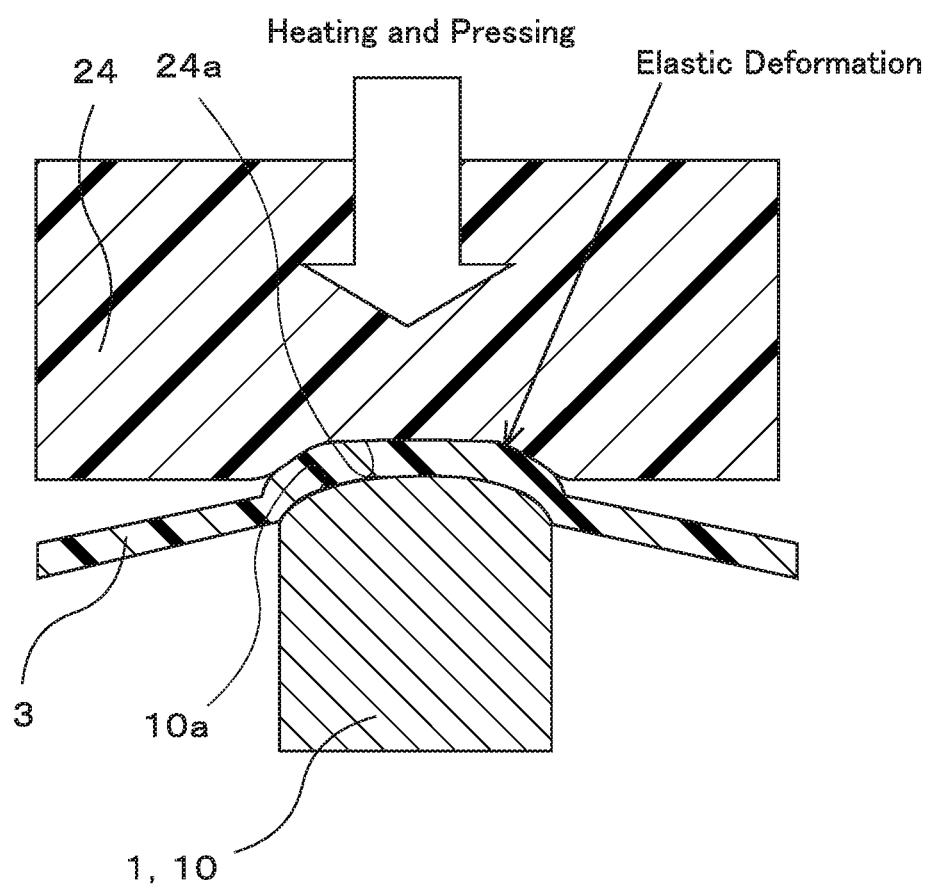
FIG. 10 is a schematic enlarged view illustrating the hot stamping process with the hot stamping apparatus according to the embodiment.
Figure 11:
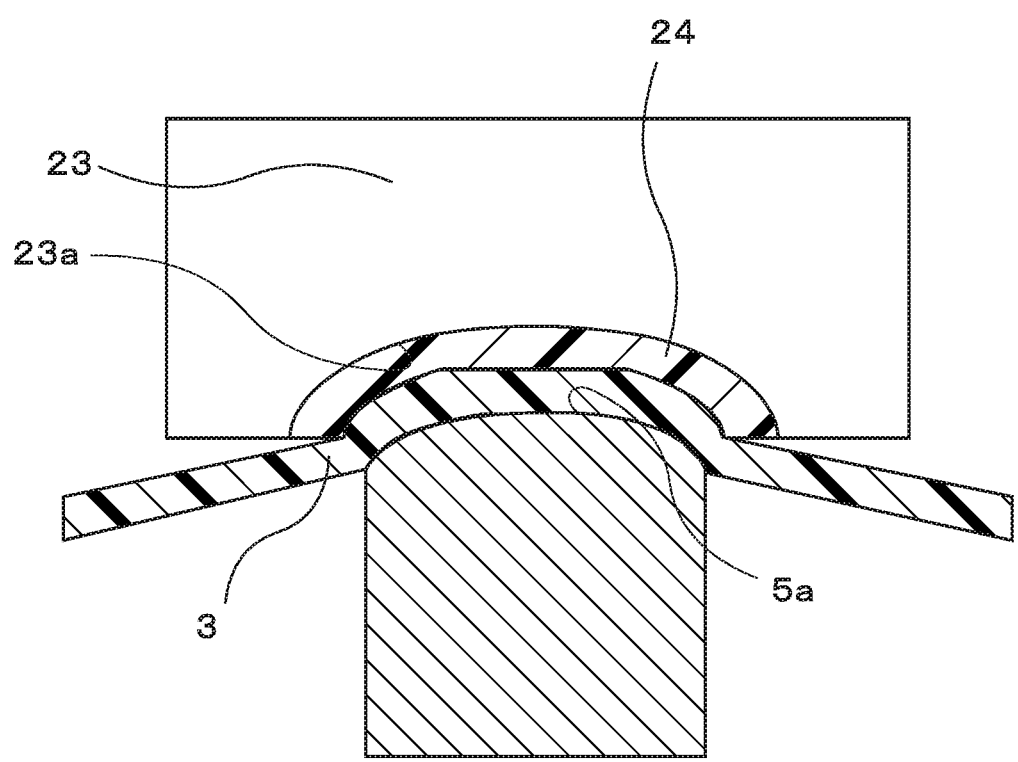
FIG. 11 is a schematic enlarged view illustrating a hot stamping process with a conventional hot stamping apparatus.
Figure 12:
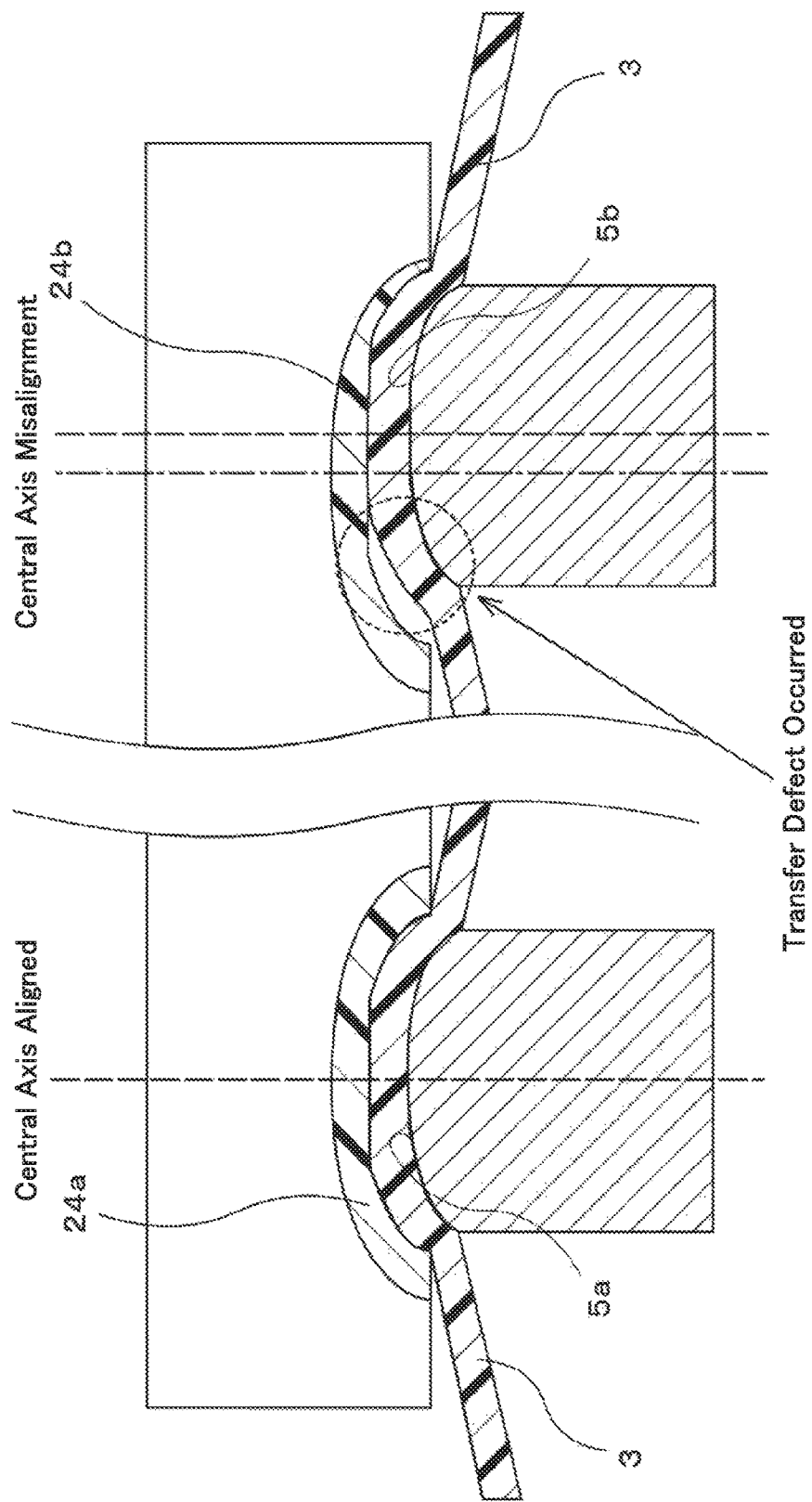
FIG. 12 is a schematic diagram illustrating the occurrence of a transfer defect with the conventional hot stamping apparatus.

The stamping block 22 is pressed further down against the area to be decorated in the grille 1 after the pressing surface 24*a* of the rubber piece 24 comes into contact with the end surfaces 10*a* of the grille 1. The rubber piece 24 as pressed against the grille 1 deforms elastically while conforming to the shapes of the ends of the ridges 10 as illustrated in FIG. 10. The heated transfer sheet 3 is also pressed against the end surfaces 10*a* of the ridges 10.

After the contact, the rubber piece 24 is pressed against the end surfaces 10*a* of the grille 1 until the pressure reaches a predetermined value. The pressure is controlled by controlling the pressure of the hydraulic unit of the pressing device 4. The pressure may be of any value, although it may be approximately 1 MPa to 4 MPa per unit area, for example. That is, a force as large as approximately 10 tf (9.8 KN) can be used for the pressing. In the embodiment, the surface sections to be decorated having a total area of 80 cm$^2$ is pressed with a force of 3.2 tf (3.1 KN).

Furthermore, the stamping block 22 is pressed down after the rubber piece 24 comes in contact with the end surfaces 10*a* of the grille 1 until a pressing distance reaches a predetermined value. The pressing distance is a predetermined value and may be approximately 1 mm, for example.

With the conditions described above being retained for a predetermined period of time, the heat on the pressing surface 24*a* of the stamping block 22 causes the adhesive layer 31 in the transfer sheet 3 and the end surfaces 10*a* of the grille 1 to soften or melt and thereby bond to each other or turn to a solid solution, allowing the foil 32 and the release layer 33 to be transferred to the end surfaces 10*a*.

When the stamping block 22 has been pressed under predetermined conditions (such predetermined conditions as the pressure, the temperature, and the time), the stamping block 22 is moved upward (away) by the pressing device 4.

By the process described above, the grille 1 having the decorative layers 13 formed on the end surfaces 10*a* of all the ridges 10 can be manufactured.

As described above, the pressing surface 24*a* of the stamping block 22 is constituted by the rubber piece 24 shaped into a flat plate. With this configuration, the decorative layers 13 can be formed on the multiple, spaced-apart end surfaces 10*a* of the ridges 10 in the grille 1 without generating a transfer defect.

Additionally, the flat plate-like rubber piece 24 is pressed against the entire area to be decorated. In this manner, the decorative layers 13 can be formed all across a large area to be decorated having a length of not less than 400 mm in the direction in which the individual end surfaces 10*a* are arranged side by side. In other words, a large area as in the grille 1 can be decorated in one process.

The manufacturing method according to the present embodiment is capable of forming the decorative layers 13 on a large component to be decorated, like the grille 1, and thus forming a large decorative molding.

[Variation]

Although the stamping block 22 is moved downward for the pressing in the embodiment described above, a stamping block 22 may be fixed while a fixture 21 is moved upward. Since the stamping block 22 includes the heating units 25, moving it up and down repeatedly may lead to breakage of a wire or entanglement of wires and resultant damage. The configuration that fixes the stamping block 22 (and moves the fixture 21 up and down) precludes such possibilities.

Additionally, with the configuration in which the hydraulic unit 42 moves the stamping block 22 up and down, there is a chance that the stamping block 22 descends (falls) if the hydraulic unit 42 malfunctions. If the stamping block 22 descends (falls) and hits the fixture 21, the fixture 21 is also damaged. It also poses a risk of an object being trapped between the fixture 21 and the stamping block 22. With the configuration in which a hydraulic unit 42 moves the fixture 21 up and down, the fixture 21 descends (falls) to move away from the stamping block 22 in the case of a malfunction of the hydraulic unit 42; thus, there is no risk of damage to the stamping block 22 or of an object trapped between the fixture 21 and the stamping block 22.

What is claimed is:

1. A method of manufacturing a decorative molding, the method comprising:

attaching a rubber piece that is flat with no projections or depressions and that has a thickness of not less than 3 mm to a pressing member to curve the rubber piece to fit the general curved shape of a plurality of ridges to be decorated that are spaced apart on a radiator grille;

pressing the rubber piece on the pressing member against a transfer sheet that includes decorative layers and the plurality of ridges on the radiator grille;

heating the rubber piece of the pressing member, the transfer sheet, and the plurality of ridges of the radiator grille during the pressing;

elastically deforming the rubber piece, during the pressing and the heating, to conform to end surfaces of the plurality of ridges of the radiator grille; and transferring the decorative layers from the transfer sheet onto the plurality of spaced-apart surface sections to be decorated on the radiator grille.

2. The method of manufacturing a decorative molding according to claim 1, further comprising measuring an applied pressure during the pressing of the pressure member onto the transfer sheet and the plurality of ridges of the radiator grille, and adjusting the applied pressure during the pressure to be in accordance with a predetermined pressure or a predetermined pressure range.

\* \* \* \* \*